Jan. 4, 1944.   C. J. KOCH   2,338,518

DYNAMO-ELECTRIC MACHINE

Filed Oct. 30, 1941

Inventor:
Charles J. Koch,
by Harry E. Dunham
His Attorney.

Patented Jan. 4, 1944

2,338,518

UNITED STATES PATENT OFFICE 2,338,518

DYNAMOELECTRIC MACHINE

Charles J. Koch, Schenectady, N. Y., assignor to General Electric Company, a corporation of New York Application October 30, 1941, Serial No. 417,128

10 Claims. (Cl. 172—274)

My invention relates to dynamo-electric machines and particularly to heating during idle periods of three-phase induction motors having a three-phase rotor winding provided with slip rings and brushes arranged to connect the rotor winding to external resistances.

Various arrangements have been suggested for keeping motor windings warm by passing current through them or by providing heaters in the motor frame in localities where moisture conditions injuriously affect the insulation of the machine. It has been found that unless a large number of small heaters is used which are distributed widely throughout the frame, all parts of the winding may not be properly warmed to prevent deterioration. Furthermore, it has been found undesirable to provide a special source of direct current to heat the windings, and unless all of the three-phase winding is heated by an alternating current, voltages may be induced in the rotor winding which will cause a current to flow through the slip rings and brushes into the external resistances connected across the rotor winding. While such an arrangement may be satisfactory for short intervals, it has been found that it produces undesirable heating and a deterioration of the brushes and the portion of the slip rings adjacent the contact with the brushes.

An object of my invention is to provide an improved three-phase electrical device having a primary and secondary winding with means for providing a single phase heating current energization to the three-phase primary winding.

Another object of my invention is to provide a dynamo-electric machine having a three-phase exciting winding and a three-phase rotatable member winding with slip rings and brushes connected thereto and having means for supplying a single phase heating current energization with the three-phase exciting winding without inducing voltages in the rotor winding tending to produce circulation of current through the slip rings and brushes.

Further objects and advantages of my invention will be better understood from the following description referring to the accompanying drawing, and the features of novelty which characterize my invention will be pointed out with particularity in the claims annexed to and forming part of this specification.

Figure 1:
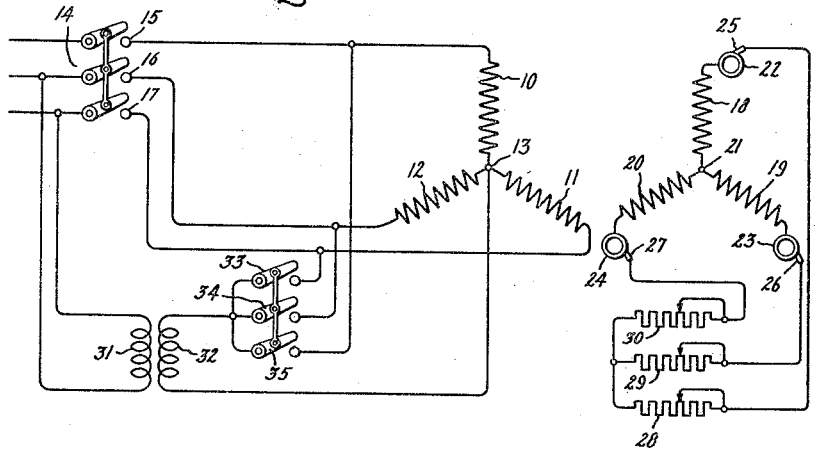
Figure 2:
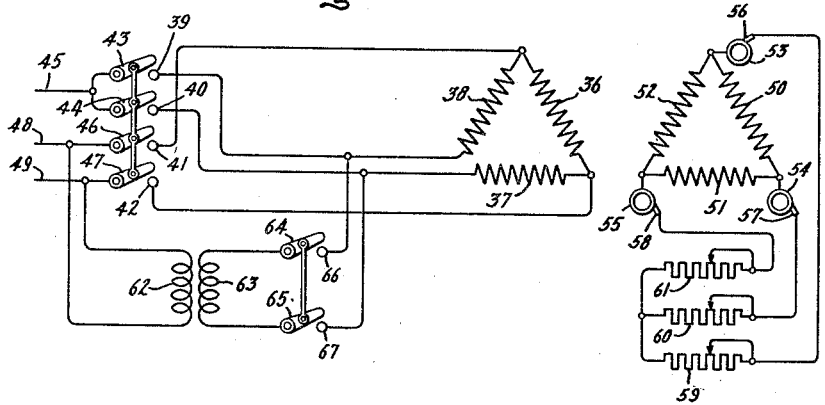

In the drawing, Fig. 1 is a schematic diagram of a Y-connected three-phase induction motor provided with an embodiment of my invention; and Fig. 2 is a schematic diagram of a Δ-connected induction motor provided with another embodiment of my invention.

Referring to the drawing, I have shown my invention in connection with an induction motor having a stationary member with an exciting winding having three phases 10, 11 and 12 connected in Y with the neutral point 13 left ungrounded and the outer terminals of the winding sections 10, 11 and 12 adapted to be connected by a contactor 14 through contacts 15, 16 and 17 to a three-phase alternating current source of electrical power supply. The motor is provided with a rotatable member having a rotor winding with three phases 18, 19 and 20 also connected in Y with the neutral point 21 left ungrounded and the other terminals of the three-phase winding sections 18, 19 and 20 connected to slip rings 22, 23 and 24, respectively. Electrical contact brushes 25, 26 and 27 are arranged to contact the slip rings 22, 23 and 24 and to connect the three-phase winding to variably external resistances 28, 29 and 30, respectively. This rotatable member circuit is of the conventional wound rotor induction motor external resistance type which is adapted to control the speed of the motor by controlling the resistance of the external rotor circuit. In order to provide the desired heating of the entire three-phase winding of the motor, a single-phase transformer is arranged to be connected between the neutral point 13 of the motor and the other terminals of the three-phase sections 10, 11 and 12 of the stationary member exciting winding. This single-phase transformer includes a primary winding 31 connected across one of the phases of the alternating current source of supply and is provided with a secondary winding 32, one terminal of which is connected to the neutral point 13 of the stator exciting winding and the other terminal of which is connected through three contactors 33, 34 and 35 to the outer terminals of the three-phase winding sections 10, 11 and 12. The single-phase transformer is adapted to provide a low voltage energizing current across each of the phases of the three-phase stationary exciting winding, and when the contactors 33, 34 and 35 are closed, a single-phase heating current energization is provided to all of the winding and these currents all flow substantially in the same direction in all three of the stator phases at the same time. The reactance of these currents is relatively low and the air gap flux produced by these currents will induce voltages in the rotor winding, but since the rotor winding is Y-connected, these currents cannot flow through the brushes because the neutral of the rotor winding is not brought out to a collector ring and is not grounded. Thus, it is seen that the desired heating of the stationary member winding will be produced without the circulation of undesirable currents through the slip rings and the current collecting brushes, and this current will provide a uniform heating of all parts of the motor, thereby preventing condensation of undesirable moisture on the various parts of the machine. This same type connection can be used with a two-phase primary for providing the same results.

In Fig. 2, I have shown another embodiment of my invention applied to a Δ-connected three-phase induction motor provided with a Δ-connected wound rotor winding. In this construction, the stator exciting winding is provided with three phase windings 36, 37 and 38 and is adapted to be connected in Δ by electrically connecting one of the terminals of the phase winding 36 to a terminal of the phase winding 37 and the other terminal thereof to a terminal of the phase winding 38, while the other terminals of the phase windings 37 and 38 are connected to contacts 39 and 40 of a main line switch provided with contacts 41 and 42 connected to the other terminals of the Δ winding. This main line switch is provided with contactors 43 and 44 connected together and adapted to make electrical connections with the contacts 39 and 40 to complete the Δ-connection of the stator exciting winding. These contactors 43 and 44 are connected to one phase 45 of a three-phase alternating current source of electrical power supply. Contactors 46 and 47 of the main line switch are adapted to make electrical connections with contacts 41 and 42 and are connected to the other two lines 48 and 49 of the three-phase alternating current source of electrical power supply. By closing the main line switch, the stationary exciting winding is connected in Δ across the three-phase source of electrical power supply and currents are induced in the three phase windings 50, 51 and 52 of the wound rotor winding, which also is connected in Δ. The terminals of the Δ-connected wound rotor winding are connected to slip rings 53, 54 and 55 and brushes 56, 57 and 58, respectively, electrically contact the slip rings and are connected to the external resistances 59, 60 and 61, respectively. For convenience in controlling the speed of the rotatable member, the external resistances 59, 60 and 61 are connected in Y, as such an arrangement is more readily adaptable to conventional control apparatus. In order to provide the desired heating current through the windings of the motor, a single-phase transformer is arranged to provide a relatively low voltage energization to the machine. This single-phase transformer includes a primary winding 62 connected across one of the phases of the three-phase source of electrical power supply and a secondary winding 63 connected across a switch having contactors 64 and 65. These contactors are adapted to make an electrical connection with contacts 66 and 67, respectively, which are connected to the terminals 39 and 40 of the stator winding phases 38 and 37, respectively. When it is desired to provide the heating energization to the windings, the main line switch is opened and the contactors 64 and 65 are closed upon the contacts 66 and 67, such that a low voltage heating current will pass through the three phases 38, 36, and 37 of the stator exciting winding in series circuit. By transformer action, a small current will be induced in the rotatable member windings 50, 51 and 52, but since this current will be a single-phase current, there will be no tendency for it to pass through the slip rings and brushes of the rotatable member winding, as the voltage induced in these windings will be substantially equal to the voltage drop through the winding caused by the current flowing therethrough, and substantially no voltage will appear across any two of the slip rings. Furthermore, since the external resistances are connected in Y, it is impossible for any single-phase current to flow through these external resistances, as a substantially equal voltage would be applied to all of the terminals of these external resistances which would be equal and opposite in direction. Thus, a substantially single-phase heating current will flow through all parts of the winding of the motor without traversing the slip rings or brushes of the rotatable member and will insure against condensation of moisture upon the windings without injurious effects to any parts of the machine. In the two figures, the rotor winding has been shown connected in the same manner as the stator winding, but the same results can be obtained if the Δ-connected rotor winding shown in Fig. 2 be substituted for the Y-connected winding of Fig. 1, or if the Y-connected rotor winding be substituted for the Δ-connected rotor winding of Fig. 2. Furthermore, these arrangements are applicable to any multiple-phase machines as well as to three-phase machines to provide the desired heating thereto.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A three-phase electrical induction device having a three-phase primary winding and a three-phase secondary winding, means including slip rings and brushes connected to said three-phase secondary winding for connecting said secondary winding to an external circuit, and means for connecting a source of single-phase heating current to the terminals of all of said phases of said primary winding in such manner to provide for the flow of single phase alternating current in the same corresponding direction through all corresponding parts of said primary winding.

2. A three-phase electrical induction device having a multiple-phase primary winding and a multiple-phase secondary winding, means including slip rings and brushes connected to said secondary winding for connecting said secondary winding to an external circuit, and means for connecting a source of single phase heating current to the terminals of all of said phases of said primary winding in a manner to provide for the flow of single phase alternating current in the same corresponding direction through all corresponding parts of said primary winding.

3. A three-phase electrical induction device having a three-phase primary winding and a three-phase secondary winding, means including slip rings and brushes connected to said three-phase secondary winding for connecting said secondary winding to an external circuit, and means for connecting a single-phase heating current source of energization to the terminals of all phases of said three-phase primary winding in a manner to provide for the flow of single phase current in the same corresponding direction through all corresponding parts of said primary winding.

4. A dynamo-electric machine having a stationary member with a three-phase exciting winding and a rotatable member with a three-phase rotor winding, means including slip rings and brushes connected to said three-phase rotor winding for connecting said rotor winding to an external circuit, and means for connecting a source of single-phase heating current to the terminals of all of the phases of said primary winding in a manner to provide for the flow of single phase alternating current in the same corresponding direction through all corresponding parts of said primary winding.

5. A three-phase electrical induction device having a three-phase primary winding and a three-phase secondary winding, means including slip rings and brushes connected to said three-phase secondary winding for connecting said secondary winding to an external circuit, and means for connecting a single-phase heating current to the terminals of all of said phases of said primary winding in a manner to provide for the flow of single phase current in the same corresponding direction through all corresponding parts of said primary winding.

6. A dynamo-electric machine having a stationary member with a three-phase exciting winding and a rotatable member with a three-phase rotor winding, means including slip rings and brushes connected to said three-phase rotor winding for connecting said rotor winding to an external circuit, and means for connecting a source of single phase alternating current to the terminals of all of the phases of said primary winding in a manner to provide for the flow of single phase alternating current in the same corresponding direction through all corresponding parts of said primary winding.

7. A dynamo-electric machine having a stationary member with a Δ-connected three-phase exciting winding and a rotatable member with a three-phase rotor winding, a single-phase transformer, and means for connecting said transformer across all of said three-phase exciting winding in series for providing a low voltage single phase heating current energization to all of said three-phase exciting winding.

8. A dynamo-electric machine having a stationary member with a Y-connected three-phase exciting winding and a rotatable member with a three-phase rotor winding, a single-phase transformer, and means for connecting said single-phase transformer across the neutral of said Y-connected exciting winding and each phase of said exciting winding for providing a low voltage single-phase heating current energization to all of said three-phase winding.

9. A dynamo-electric machine having a stationary member with a three-phase exciting winding and a rotatable member with a Δ-connected three-phase rotor winding, means including slip rings and brushes connected to said three-phase rotor winding for connecting said rotor winding to an external circuit, and means for connecting a single-phase source of electrical power supply across said three-phase stationary member winding with all three phases connected in series for providing a single phase heating current energization to all of said three-phase exciting winding and to said rotor winding without circulation of current through said slip rings and brushes.

10. A dynamo-electric machine having a stationary member with a Y-connected three-phase exciting winding and a rotatable member with a three-phase rotor winding, means including slip rings and brushes connected to said three-phase rotor winding for connecting said rotor winding to an external circuit, and means including a single phase transformer arranged to be connected across the neutral of said Y-connected exciting winding and each phase of said exciting winding for providing a low voltage single-phase heating current energization to all of said three-phase exciting winding without inducing voltages in said rotor winding tending to produce circulation of current through said slip rings and brushes.

CHARLES J. KOCH.